(12) United States Patent
Desloover (10) Patent No.: US 8,713,861 B2
(45) Date of Patent: May 6, 2014

(54) ROOF TILES AND RELATED SYSTEMS

(75) Inventor: Paul Desloover, Atlanta, GA (US)

(73) Assignee: Solus Engineering, LLC, Altanta, GA (US)

( * ) Notice: Subject to any disclaimer, the term of this patent is extended or adjusted under 35 U.S.C. 154(b) by 0 days.

(21) Appl. No.: 13/992,829

(22) PCT Filed: Dec. 5, 2011

(86) PCT No.: PCT/US2011/063244
§ 371 (c)(1),
(2), (4) Date: Jul. 15, 2013

(87) PCT Pub. No.: WO2012/078491
PCT Pub. Date: Jun. 14, 2012

(65) Prior Publication Data
US 2013/0291456 A1 Nov. 7, 2013

Related U.S. Application Data

(60) Provisional application No. 61/421,862, filed on Dec. 10, 2010.

(51) Int. Cl.
*E04D 13/18* (2014.01)
*F24J 2/04* (2006.01)

(52) U.S. Cl.
CPC .................... *F24J 2/045* (2013.01)
USPC ............. 52/173.3; 52/518; 126/622

(58) Field of Classification Search
CPC ........ Y02B 10/12; Y02B 10/14; Y02B 10/10; H01L 31/042; H01L 31/0482; H01L 31/0483; H01L 27/1422; F24J 2/045; F24J 2002/0053; F24J 2/5254; F24J 2/0455; F24J 2002/0061; Y01S 323/906; B32B 2457/12
USPC ........ 52/173.3, 518, 525, 526, 528, 531, 542, 52/546, 554, 555; 136/244, 252; 126/621, 126/622, 623
See application file for complete search history.

(56) References Cited

U.S. PATENT DOCUMENTS 730,131 A * 6/1903 Klay ............................... 52/542
4,729,202 A * 3/1988 Ferland ........................... 52/520
(Continued)

FOREIGN PATENT DOCUMENTS

DE 4227929 A1 3/1994
DE 19921044 A1 12/2000
(Continued)

OTHER PUBLICATIONS

International Search Report and Written Opinion for PCT/US2011/063244.

*Primary Examiner* — William Gilbert
*Assistant Examiner* — Gisele Ford
(74) *Attorney, Agent, or Firm* — McClure, Qualey & Rodack, LLP (57) ABSTRACT

Roof tile systems for structures are provided. A representative system (100) includes a solar panel tile (102) having a top side (121) for facing away from a structure, a bottom side (122) for facing lower side (126) for facing the downslope direction, the solar panel (150), the solar panel tile (102) having a first rib (131, 132, 133, 134) extending across the cavity (128); and a solar panel (150) mounted within the cavity (128) and supported by the first rib (131, 132, 133, 134) such that the solar panel tile (102) being a first of multiple solar panel tiles (102), with the multiple tiles being operative to engage in a side-by-side arrangement to form at least a partial course of tiles of the system (100).

14 Claims, 10 Drawing Sheets

(56) References Cited

U.S. PATENT DOCUMENTS

| | | | |
|---|---|---|---|
| 6,360,497 B1* | 3/2002 | Nakazima et al. | 52/173.3 |
| 6,453,629 B1* | 9/2002 | Nakazima et al. | 52/173.3 |
| 6,489,552 B2* | 12/2002 | Yamawaki et al. | 136/251 |
| 6,506,970 B2* | 1/2003 | Yamawaki | 136/251 |
| 6,960,716 B2* | 11/2005 | Matsumi et al. | 136/244 |
| 7,138,578 B2* | 11/2006 | Komamine | 136/251 |
| 7,140,153 B1 | 11/2006 | Humphreys et al. | |
| 7,506,477 B2* | 3/2009 | Flaherty et al. | 52/173.3 |
| 7,509,775 B2* | 3/2009 | Flaherty et al. | 52/173.3 |
| 8,186,111 B2* | 5/2012 | Flaherty et al. | 52/173.3 |
| 8,276,329 B2* | 10/2012 | Lenox | 52/173.3 |
| 8,458,967 B2* | 6/2013 | Kalkanoglu et al. | 52/173.3 |
| 8,476,523 B2* | 7/2013 | Bennett | 136/251 |
| 8,590,270 B2* | 11/2013 | Martinique | 52/748.1 |
| 2003/0154667 A1* | 8/2003 | Dinwoodie | 52/173.3 |
| 2003/0154680 A1* | 8/2003 | Dinwoodie | 52/519 |
| 2006/0000178 A1 | 1/2006 | Almy | |
| 2007/0157963 A1* | 7/2007 | Metten et al. | 136/251 |
| 2008/0098672 A1* | 5/2008 | O'Hagin et al. | 52/173.3 |
| 2008/0289679 A1* | 11/2008 | Ressler | 136/244 |
| 2008/0302030 A1* | 12/2008 | Stancel et al. | 52/173.3 |
| 2009/0044854 A1* | 2/2009 | Placer et al. | 136/251 |

FOREIGN PATENT DOCUMENTS

| | | |
|---|---|---|
| DE | 202006012708 U1 | 11/2006 |
| DE | 202008001826 U1 | 5/2008 |
| EP | 1995791 A2 | 11/2008 |
| EP | 2149646 A2 | 2/2010 |
| WO | 2008/137966 A2 | 11/2008 |

* cited by examiner

ROOF TILES AND RELATED SYSTEMS

CROSS REFERENCE TO RELATED APPLICATION

This utility application claims priority to U.S. Provisional Application 61/421,862, filed Dec. 10, 2010, the contents of which are incorporated herein by reference in their entirety.

BACKGROUND

1. Technical Field

This disclosure relates to tiled roofing systems.

2. Description of the Related Art

Conventional tiled roofing systems are known that have met with varying degrees of success. However, these systems do little to address many modern needs associated with responsible energy usage and acquisition.

SUMMARY

Roof tiles and related systems are provided. In this regard, an exemplary embodiment of a roof tile system comprises: a solar panel tile having a top side for facing away from a structure, a bottom side for facing the structure, a left side, a right side, an upper side for facing the upslope direction and a lower side for facing the downslope direction, the solar panel tile defining a cavity sized and shaped for mounting therein a solar panel, the solar panel tile having a first rib extending across the cavity; and a solar panel mounted within the cavity and supported by the first rib such that the solar panel is flush mounted with respect to the top side of the solar panel tile; the solar panel tile being a first of multiple solar panel tiles, with the multiple tiles being operative to engage in a side-by-side arrangement to form at least a partial course of tiles of the system.

Another exemplary embodiment of a roof tile system comprises: a left edge tile having a top side for facing away from a structure, a bottom side for facing the structure, a left side, a right side, an upper side for facing an upslope direction and a lower side for facing a downslope direction, the left edge tile further having a left side extended portion spanning along a length of the left side of the left edge tile and extending from the top side, passed the bottom side and to a distance beyond the bottom side of the left edge tile; a field tile having a top side for facing away from a structure, a bottom side for facing the structure, a left side, a right side, an upper side for facing the upslope direction and a lower side for facing the downslope direction; a solar panel tile having a top side for facing away from a structure, a bottom side for facing the structure, a left side, a right side, an upper side for facing the upslope direction and a lower side for facing the downslope direction, the solar panel tile defining a cavity sized and shaped for mounting therein a solar panel; and a right edge tile having a top side for facing away from a structure, a bottom side for facing the structure, a left side, a right side, an upper side for facing the upslope direction and a lower side for facing the downslope direction, the right edge tile further having a right side extended portion spanning along a length of the right side of the right edge tile and extending from the top side, passed the bottom side and to a distance beyond the bottom side of the right edge tile; the left edge tile, the field tile, the solar panel tile and the right edge tile being operative to engage in a side-by-side arrangement to form at least a partial course of tiles of the system in which at least one of the tiles at least partially overlaps an adjacent one of the tiles.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Roof tiles and related systems are provided, several exemplary embodiments of which will be described in detail. In some embodiments, a roof tile system incorporates several different tile configurations that can be combined in various arrangements. Such tile configurations can include field tiles and solar panel tiles (which, as the name implies, mount solar panels). Additionally, right edge tiles and left edge tiles that are designed for trimming out the right and left sides, respectively, of an assembly of tiles can be provided. Notably, in some embodiments, the tiles are formed of durable weather-resistant materials and can be colored and/or textured to reduce surface temperature, which can have a detrimental effect on solar panels.

Figure 1:
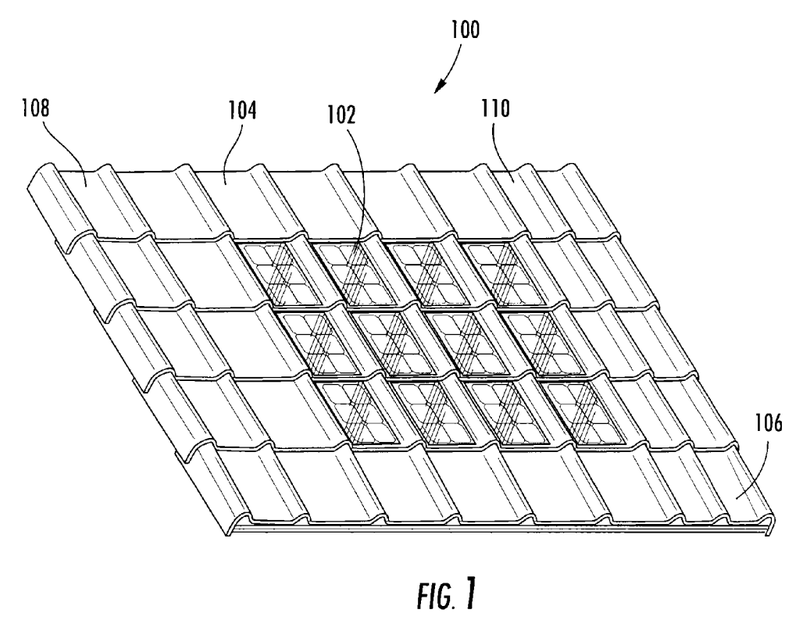
FIG. 1 is a perspective view of an exemplary embodiment of a roof system.

Referring in more detail to the drawings, FIG. 1 is a perspective view of an exemplary embodiment of a roof system. As shown in FIG. 1, roof tile system 100 incorporates five types of tiles: a solar panel tile (e.g., tile 102), a field tile (e.g., tile 104), a right edge tile (e.g., tile 106), a left edge tile (e.g., tile 108) and a partial tile (e.g., tile 110). The tiles are arranged in a multi-course configuration, with each course being formed of tiles in a side-by-side configuration. In this embodiment, a portion of each lower course is overlapped by a portion of an upper course of tiles, and as to adjacent tiles within a course, each tile positioned to the right is overlapped by a portion of the corresponding tile positioned to its left.

Figure 2:
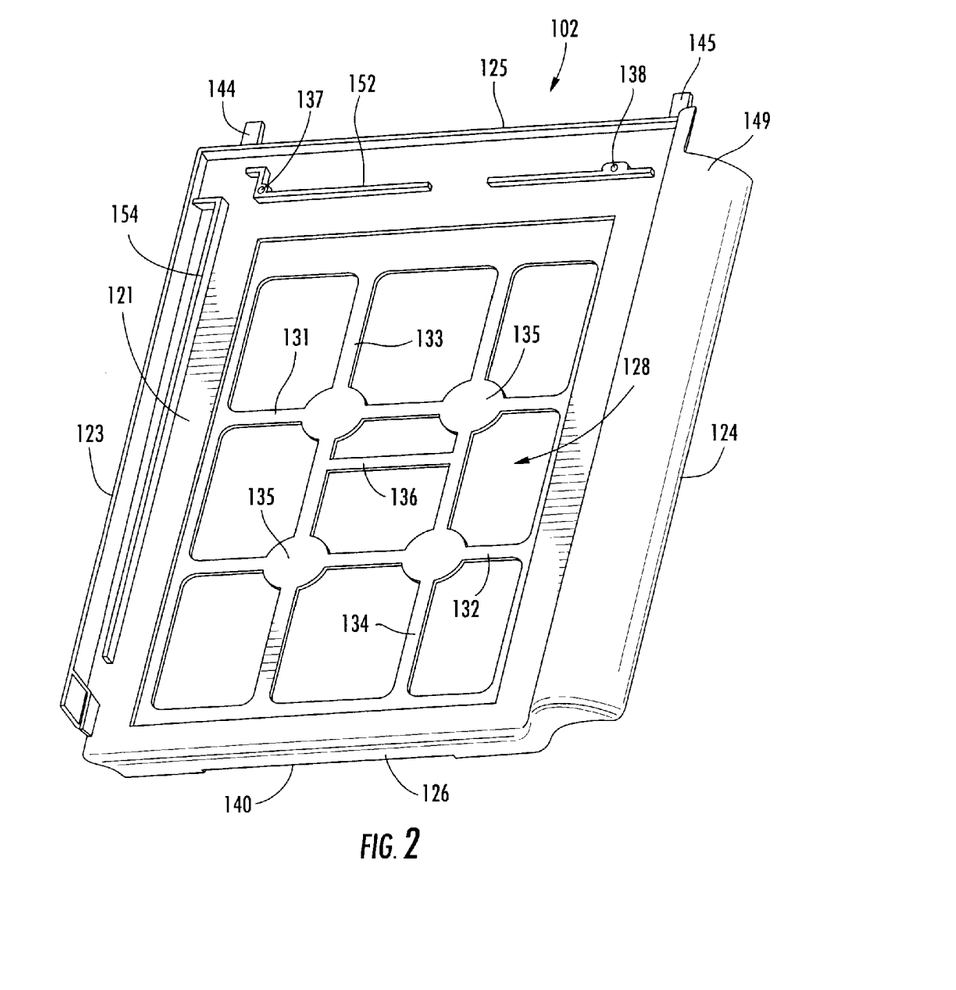
FIG. 2 is a perspective, top view of an exemplary embodiment of a solar panel tile.
Figure 3:
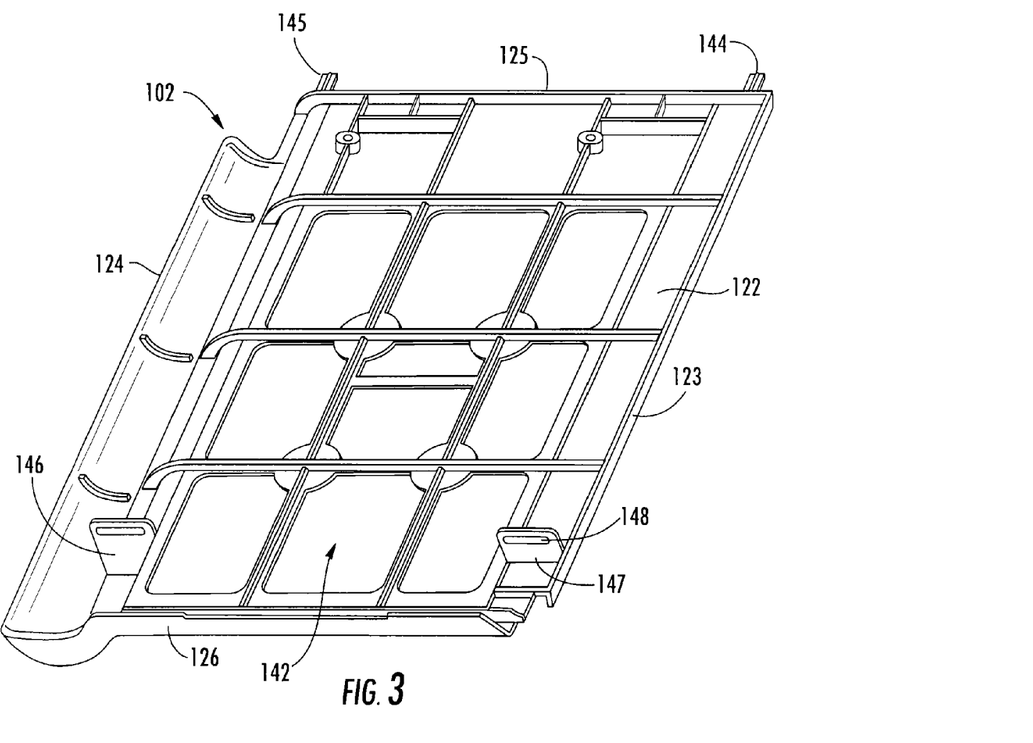
FIG. 3 is a perspective, bottom view of the solar panel tile of FIG. 2.

An exemplary embodiment of a solar panel tile is shown in FIGS. 2 and 3, in which FIG. 2 is a top view of solar panel tile 102 and FIG. 3 is a bottom view. As shown, tile 102 includes a top side 121 for facing away from a support structure, a bottom side 122 for facing the structure, a left side 123, a right side 124, an upper side 125 for facing the upslope direction and a lower side 126 for facing the downslope direction. Prominently, tile 102 also defines a cavity 128 that is sized and shaped for mounting therein a solar panel (not shown in FIGS. 2 and 3). In the embodiment shown, the cavity is an open cavity located at a central portion of the top side of the tile, with several ribs spanning across the open cavity. Specifically, two main ribs 131, 132 span the cavity widthwise, and two main ribs 133, 134 span the cavity lengthwise. Additionally, intersections of the main ribs include platforms, of which four are included in this embodiment (e.g., platform 135), that are sized and shaped to receive respective daubs of adhesive for bonding the solar panel to the tile. Further, a minor rib 136 spans between ribs 133, 134 to add rigidity and to facilitate routing of wiring associated with the solar panel. This support will help limit the bending of the solar panel in general and in case of dynamic loads.

Screw holes (137, 138) are provided to facilitate mounting of the tiles to a batten structure. In some embodiments, one or more of the screw holes can be configured an elongated slot to facilitate tile expansion and contraction.

Also shown in FIGS. 2 and 3 is a vent opening 140 positioned along the lower side of the solar panel tile. The vent opening facilitates air flow into a cooling channel 142 formed beneath the solar panel. That is, the tile is designed for cooling and ventilation that gives a superior functioning of the solar panels. Notably, excessive heat reduces the efficiency of solar panels. This opening allows the wind and the air to penetrate under the solar roof tile and between the battens to cool down the solar panel element. A continuous flow of air will be created in this way that cools the solar panel temperature in order to enhance generation of electric power.

Additionally, the solar panel tile includes a pair of locking pins (144, 145) that protrude outwardly from the upper side of the tile. The locking pins are sized and shaped to mate with corresponding locking members positioned on the bottom side of tile of an overlying course of tiles. Notably, the tile 102 carries the locking members (146, 147) for engaging the corresponding locking pins of an adjacent tile. Each of the locking members has an aperture (e.g., aperture 148) formed therein for receiving a corresponding locking pin. In some embodiments, the aperture is configured as a laterally-oriented, elongated slot. In such an embodiment, the locking pin can exhibit lateral play within the slot which accommodates lateral movement of the associated tile.

Notably, on a side of the tile (e.g., on the right side) is a curved element 149 that is configured to cover an edge of an adjacent roof tile. As such, in an assembled configuration, adjacent tiles overlap each other in the sideways direction. This overlap protects the underlying roof structure from the natural elements such as rain, wind and sun.

Figure 4:
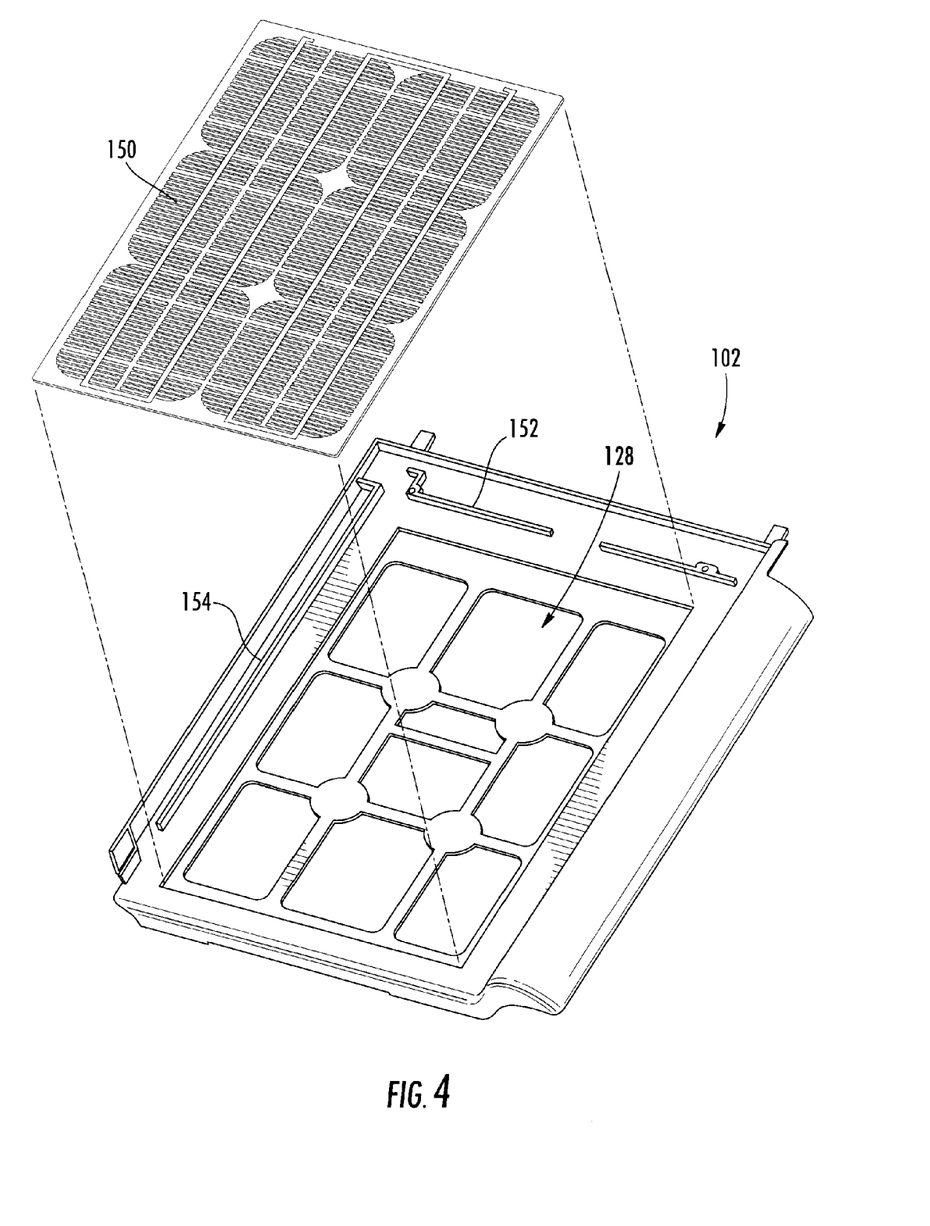
FIG. 4 is a partially-exploded view of the solar panel tile of FIG. 2.

As shown in FIG. 4, a solar panel 150 is mounted within the cavity and supported by the ribs. In this embodiment, the solar panel is flush mounted with respect to the top side of the solar panel tile when mounted. Also shown in FIG. 4 are raised drip barriers 152, 154 that are used to direct water about the surface of the tile to reduce the opportunity for water to flow under a neighboring tile. Once assembled, the drip barriers are positioned under the curved element of an adjacent tile.

In some embodiments, the width and length of a representative tile is determined by the size of a broken up solar cell. Broken up cells are high performing cells that produce more electric power than full cells.

An exemplary method for securing a solar panel to a tile involves using bonding material (e.g., polymer or silicone bonding glue). For instance, before placing bonding material, a plasma treatment is applied to the cavity and bonding surfaces to activate the molecules. This process allows the molecules to react better with the bonding material.

In one such process, within 2 minutes after applying plasma, a bonding paste of approximately 150 grams per solar roof tile is injected on the bonding surfaces of the opening to hold the solar panel. The bonding material is 2 components and is water resistant and also resists extreme temperatures of −40 Celsius (−38 Fahrenheit) freezing and heats up to +85 Celsius (+185 Fahrenheit) this according to German normalization for solar roof tiles. German normalization is the world standard for solar panels and solar roof tiles. In other embodiments, various other amounts and/or types of bonding material (e.g., a single component material) can be used.

Preferably, the bonding is able to expand and shrink under these extreme temperatures. The bonding also preferably resists dynamic concentrated pressures of hail and a human stepping on the solar roof tile and solar panel.

The solar panels are made to resist the natural elements and occasional pressures. The top layer of the solar panel is preferably made of laminated glass that allows light penetration in the best condition to produce electric power.

Figure 5:
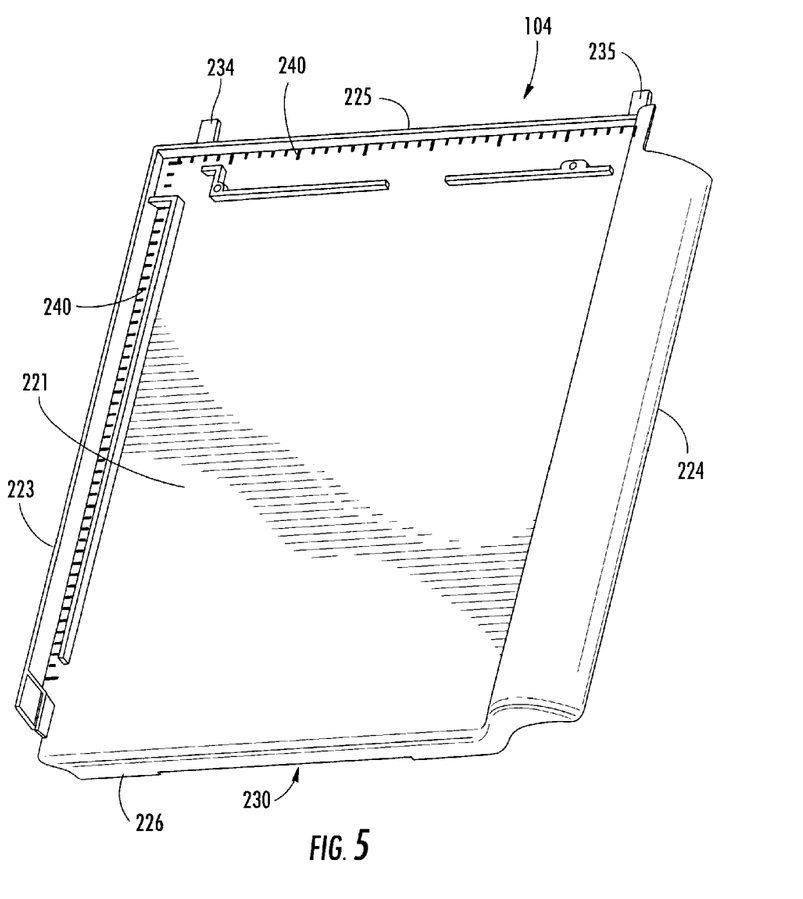
FIG. 5 is a perspective, top view of an exemplary embodiment of a field tile.
Figure 6:
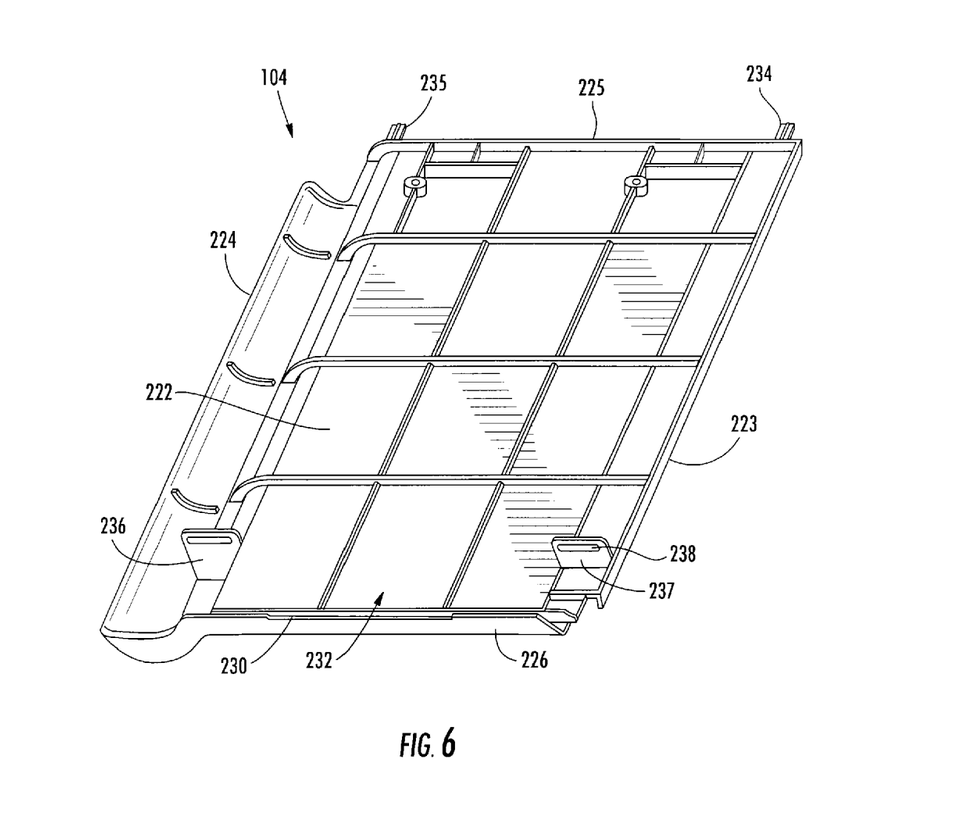
FIG. 6 is a perspective, bottom view of the field tile of FIG. 5.

FIGS. 5 and 6 depict an exemplary embodiment of a field tile 104, with FIG. 5 being a top view of the tile and FIG. 6 being a bottom view. As shown, tile 104 includes a top side 221 for facing away from a support structure, a bottom side 222 for facing the structure, a left side 223, a right side 224, an upper side 225 for facing the upslope direction and a lower side 226 for facing the downslope direction. Tile 104 also includes a vent opening 230 positioned along the lower side of the tile to facilitate air flow into a cooling channel 232 formed beneath the tile.

Additionally, tile 104 includes a pair of locking pins (234, 235) that protrude outwardly from the upper side of the tile. The locking pins are sized and shaped to mate with corresponding locking members positioned on the bottom side of tile of an overlying course of tiles. In some embodiments, the pins are T-shaped and long enough to allow vertical movement of the roof tiles. Thus, each roof tile can move up or down or top to bottom under limited measurements. This may be needed when calculating a roof to determine the number of roof tiles needed from top to bottom. By moving the roof tiles more outward or inward on the pins, cutting of roof tiles can be limited because the tiles are still secured to one another across a range of variable widths and lengths.

Notably, the tile 104 carries the locking members (236, 237) for engaging the corresponding locking pins of an adjacent tile. Each of the locking members has an aperture (e.g., aperture 238) formed therein for receiving a corresponding locking pin. In some embodiments, the aperture is configured as a laterally-oriented, elongated slot. In such an embodiment, the locking pin can exhibit lateral play within the slot which accommodates lateral movement of the associated tile.

In some embodiments, the characteristics of the pin are also to allow roof tiles to be placed under an angle of 5%. Practical example: the bottom 3 roof tiles are tilted up 5% on the end of a roof structure sometimes done on ranch homes. The T-shaped pin can be partially cut off on the bottom so the roof tiles can end up in an angle and still hold the roof resistant against the wind. It should be noted that the two types of roof tiles previously described, the solar panel tile and the field tile, can use the same technique of roof tile pins and apertures as locking systems.

As best shown in FIG. 6, a tile can incorporate a roof tile tape (240) that can be used as an aid to cut roof tiles to desired dimensions.

Figure 7:
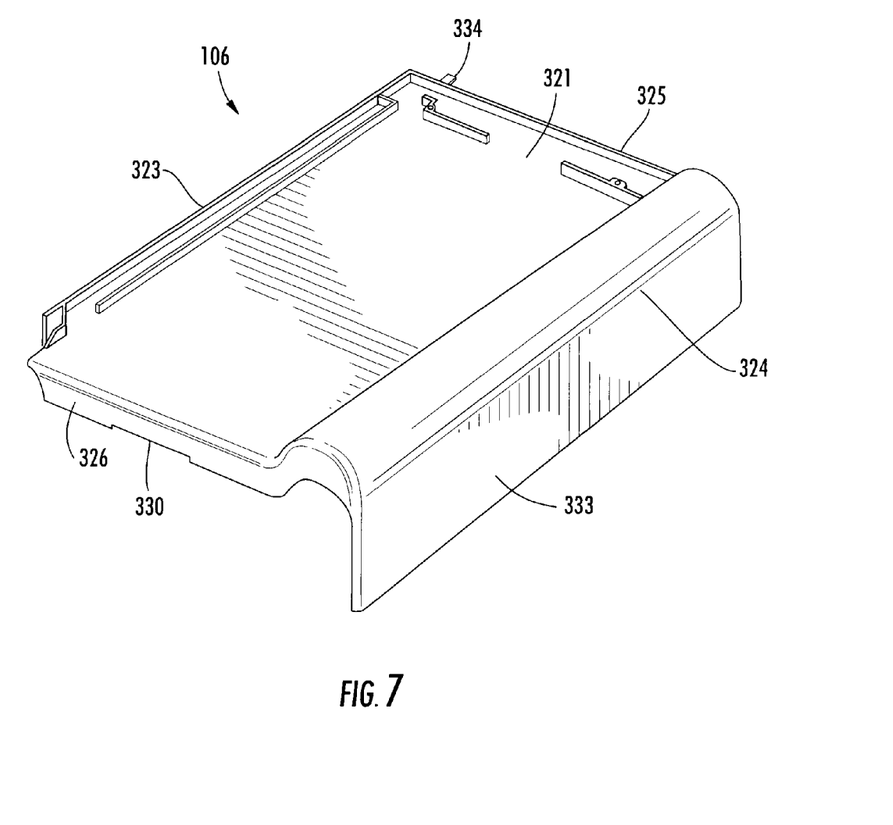
FIG. 7 is a perspective, top view of an exemplary embodiment of a right edge tile.
Figure 8:
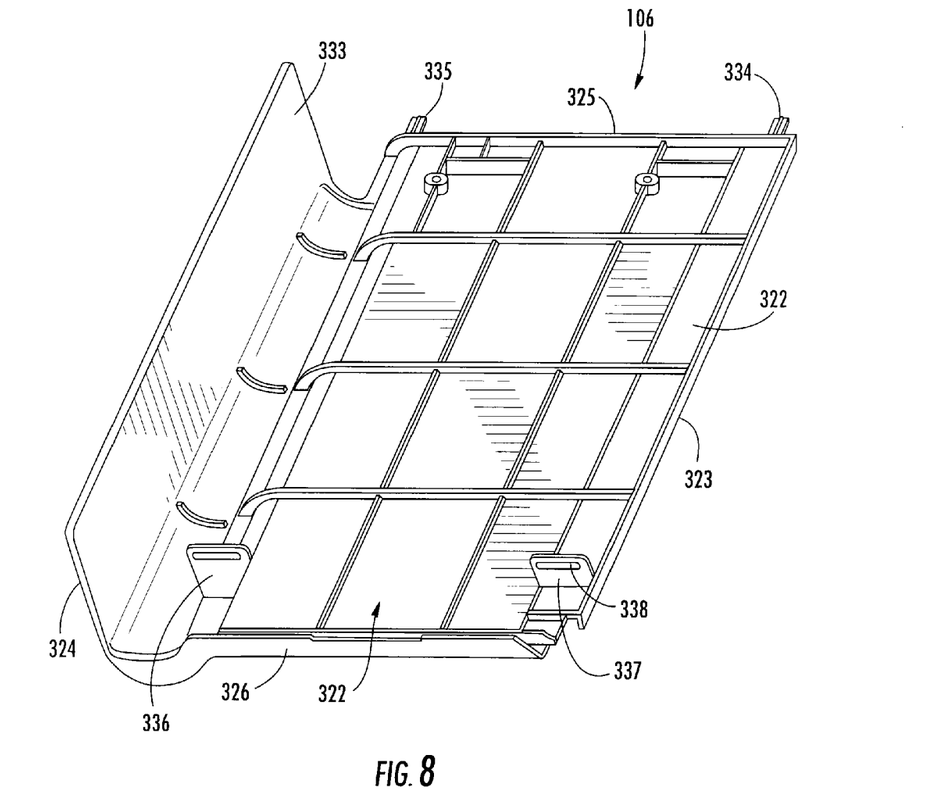
FIG. 8 is a perspective, bottom view of the right edge tile of FIG. 7.

FIG. 7 is a perspective, top view of an exemplary embodiment of a right edge tile 106, with FIG. 8 showing the bottom view of the tile. As shown, tile 106 includes a top side 321 for facing away from a support structure, a bottom side 322 for facing the structure, a left side 323, a right side 324, an upper side 325 for facing the upslope direction and a lower side 326 for facing the downslope direction. Tile 106 also includes a vent opening 330 positioned along the lower side of the tile to facilitate air flow into a cooling channel 332 formed beneath the tile. Notably, tile 106 also includes a right side extended portion 333 spanning along a length of the right side of the right edge tile, with the right side exhibiting a cylindrical shape along the top side of the tile. This extended portion extends from the top side, passed the bottom side and to a distance beyond the bottom side of the right edge tile. So configured the right edge tile is adapted to end a course of tiles by being the last tile of the course on the right hand side, with the extended portion acting to finish the course by partially covering the side of the batten structure to which the tile is attached in some embodiments.

Additionally, tile 106 includes a pair of locking pins (334, 335) that protrude outwardly from the upper side of the tile. The locking pins are sized and shaped to mate with corresponding locking members positioned on the bottom side of tile of an overlying course of tiles. In some embodiments, the pins are T-shaped and long enough to allow vertical movement of the roof tiles. Thus, each roof tile can move up or down or top to bottom under limited measurements. This may be needed when calculating a roof to determine the number of roof tiles needed from top to bottom. By moving the roof tiles more outward or inward on the pins, cutting of roof tiles can be limited because the tiles are still secured to one another across a range of variable widths and lengths.

Notably, the tile 106 carries the locking members (336, 337) for engaging the corresponding locking pins of an adjacent tile. Each of the locking members has an aperture (e.g., aperture 338) formed therein for receiving a corresponding locking pin. In some embodiments, the aperture is configured as a laterally-oriented, elongated slot. In such an embodiment, the locking pin can exhibit lateral play within the slot which accommodates lateral movement of the associated tile.

A left edge tile (e.g., tile 108) can be configured as a mirror image of tile 106 in some embodiments.

Figure 9:
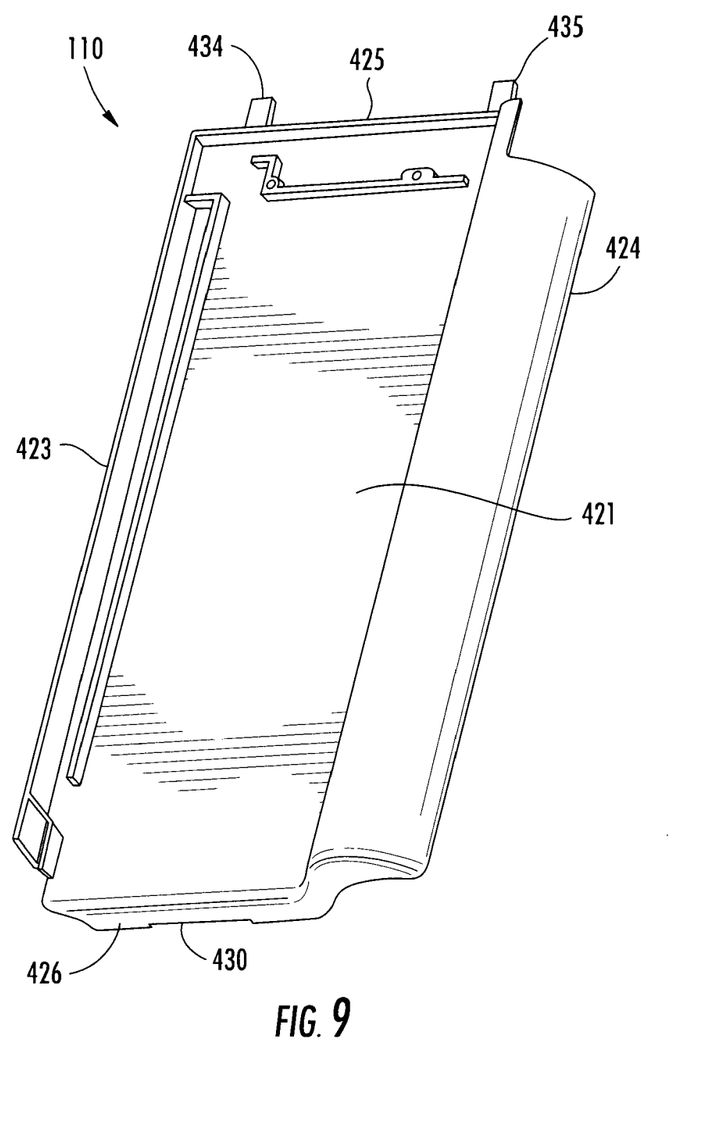
FIG. 9 is a perspective, top view of an exemplary embodiment of a partial tile.
Figure 10:
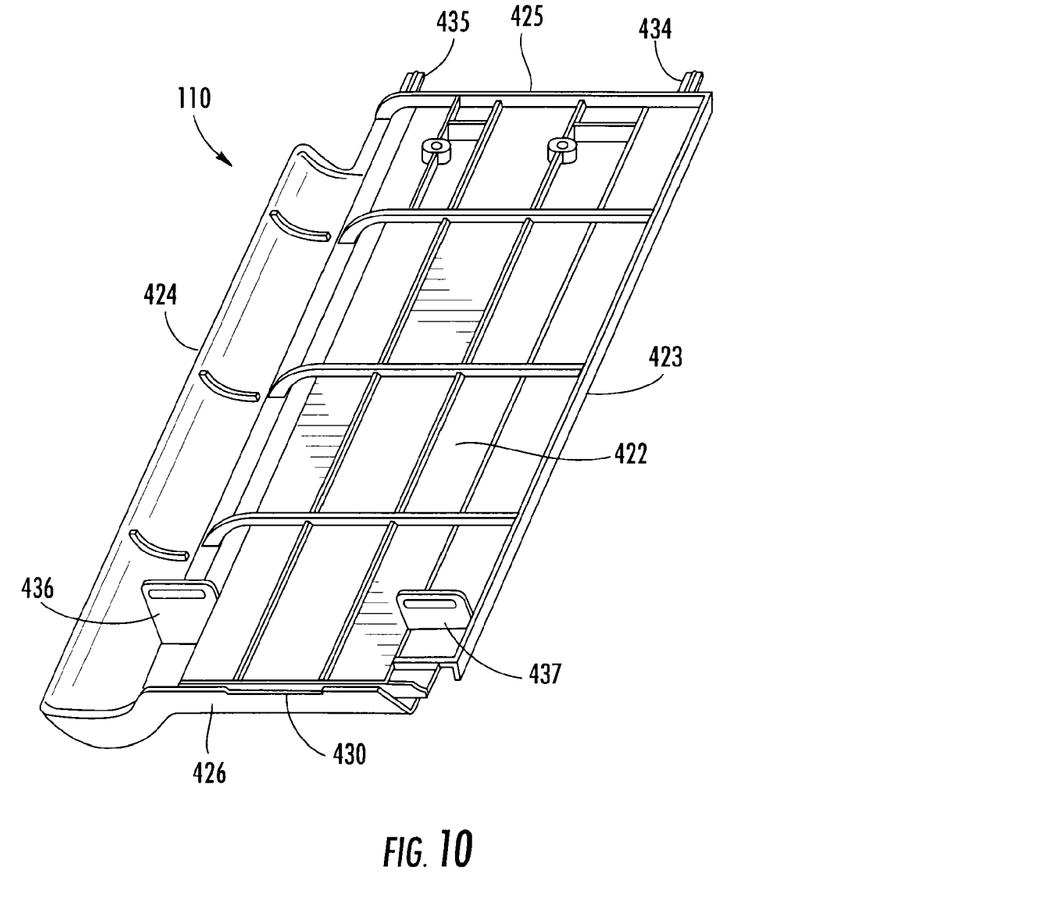
FIG. 10 is a perspective, bottom view of the partial tile of FIG. 9.

FIG. 9 is a perspective, top view of an exemplary embodiment of a partial tile, with FIG. 10 showing the bottom view of the tile. As shown, tile 110 includes a top side 421 for facing away from a support structure, a bottom side 422 for facing the structure, a left side 423, a right side 424, an upper side 425 for facing the upslope direction and a lower side 426 for facing the downslope direction. Tile 106 also includes a vent opening 430.

Additionally, tile 110 includes a pair of locking pins (434, 435) that protrude outwardly from the upper side of the tile and locking members (436, 437) for engaging the corresponding locking pins of an adjacent tile.

In some embodiments, the partial tile has a width that is half the width of a field tile. Notably, availability of partial tiles can reduce cut that need to be made onsite for assembling a roof tile system.

Roof tiles can be formed of various materials and by various techniques. In some embodiments, high pressured injection technologies with colored polypropylene mixed and strengthened with glass fibers are used. Additionally, the surface of a tile can be is flat with a microscopic structured surface. This can be configured to reduce sun reflection and prevent excessive surface temperatures. A UV resistant factor can also be included with or without a color master badge.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A roof tile system for a structure, the system comprising:
a left edge tile having a top side for facing away from a structure, a bottom side for facing the structure, a left side, a right side, an upper side for facing an upslope direction and a lower side for facing a downslope direction, the left edge tile further having a left side extended portion spanning along a length of the left side of the left edge tile and extending from the top side, passed the bottom side and to a distance beyond the bottom side of the left edge tile;
a field tile having a top side for facing away from a structure, a bottom side for facing the structure, a left side, a right side, an upper side for facing the upslope direction and a lower side for facing the downslope direction;
a solar panel tile having a top side for facing away from a structure, a bottom side for facing the structure, a left side, a right side, an upper side for facing the upslope direction and a lower side for facing the downslope direction, the solar panel tile defining a cavity sized and shaped for mounting therein a solar panel; and
a right edge tile having a top side for facing away from a structure, a bottom side for facing the structure, a left side, a right side, an upper side for facing the upslope direction and a lower side for facing the downslope direction, the right edge tile further having a right side extended portion spanning along a length of the right side of the right edge tile and extending from the top side, passed the bottom side and to a distance beyond the bottom side of the right edge tile;
the left edge tile, the field tile, the solar panel tile and the right edge tile being operative to engage in a side-by-side arrangement to form at least a partial course of tiles of the system in which at least one of the tiles at least partially overlaps an adjacent one of the tiles.

2. The system of claim 1, wherein the field tile has an elongate curved element extending between the upper side and the lower side, the curved element being formed by a protruding portion of the top side and a recessed portion of the bottom side, the curved element being operative to overlap a side of an adjacent tile of the system.

3. The system of claim 1, wherein the cavity of the solar panel tile is located at a central portion of the top side of the solar panel tile.

4. The system of claim 1, wherein:
the cavity of the solar panel tile is an open cavity; and
the system further comprises a first rib spanning across the open cavity.

5. The system of claim 1, further comprising a solar panel positioned within the cavity and mounted to the solar panel tile.

6. The system of claim 5, further comprising a vent opening positioned along the lower side of the solar panel tile, the vent opening being operative to facilitate air flow into a cooling channel formed beneath the solar panel.

7. The system of claim 1, wherein the field tile further comprises:

a locking pin protruding outwardly from the upper side of the field tile; and a locking member positioned on the bottom side of the field tile, the locking member having an aperture formed therein and being operative to receive a corresponding locking pin from an adjacent tile located in an adjacent course of tiles of the system.

8. The system of claim 7, wherein the aperture is configured as a laterally-oriented, elongated slot such that a corresponding locking pin exhibits lateral play within the slot.

9. The system of claim 7, wherein:
the locking pin is a first locking pin and the locking member is a first locking member; and
the field tile further comprises a second locking pin and a second locking member.

10. The system of claim 7, wherein the locking member has a downwardly extending portion that extends outwardly from the bottom side of the field tile, the locking member being operative to set a pitch of the field tile, relative to a support structure, in an installed configuration.

11. The system of claim 1, wherein the tiles are formed of glass fiber reinforced polypropylene.

12. The system of claim 1, further comprising a partial tile having a top side for facing away from a structure, a bottom side for facing the structure, a left side, a right side, an upper side for facing the upslope direction and a lower side for facing the downslope direction, the partial tile having a width narrower than a width of the field tile.

13. The system of claim 12, wherein the partial tile has a width that is half the width of the field tile.

14. A roof tile system for a structure, the system comprising: a solar panel tile having a top side for facing away from a structure, a bottom side for facing the structure, a left side, a right side, an upper side for facing the upslope direction and a lower side for facing the downslope direction, the solar panel tile defining a cavity sized and shaped for mounting therein a solar panel, the solar panel tile having a first rib extending across the cavity;

and a solar panel mounted within the cavity and supported by the first rib such that the solar panel is flush mounted with respect to the top side of the solar panel tile; the solar panel tile being a first of multiple solar panel tiles, with the multiple tiles being operative to engage in a side-by-side arrangement to form at least a partial course of tiles of the system;

a left edge tile having a top side for facing away from a structure, a bottom side for facing the structure, a left side, a right side, an upper side for facing an upslope direction and a lower side for facing a downslope direction, the left edge tile further having a left side extended portion spanning along a length of the left side of the left edge tile and extending from the top side, passed the bottom side and to a distance beyond the bottom side of the left edge tile; and a right edge tile having a top side for facing away from a structure, a bottom side for facing the structure, a left side, a right side, an upper side for facing the upslope direction and a lower side for facing the downslope direction, the right edge tile further having a right side extended portion spanning along a length of the right side of the right edge tile and extending from the top side, passed the bottom side and to a distance beyond the bottom side of the right edge tile.

\* \* \* \* \*